July 16, 1957     A. T. PITMAN     2,799,328
FLEXIBLE BAND TYPE ADJUSTABLE TIRE BEAD SPREADING TOOL
Filed March 29, 1954
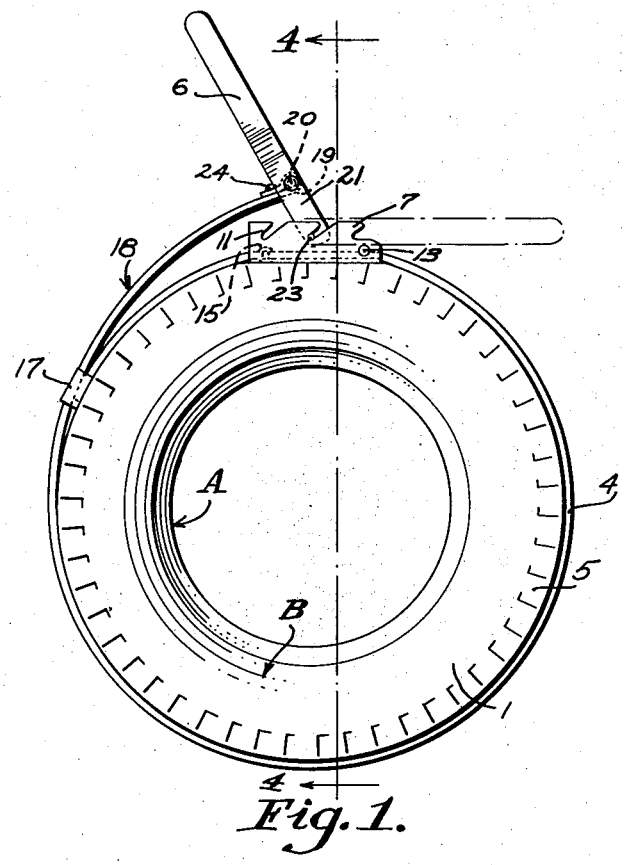
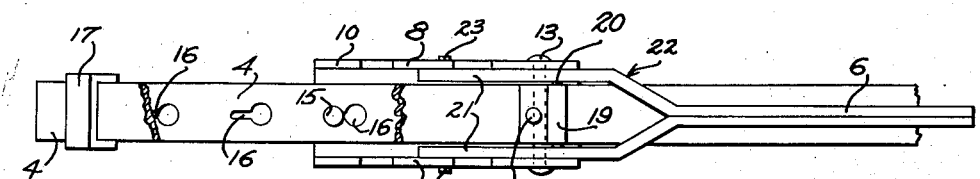
INVENTOR
*Alfred T. Pitman*
BY *Thresor, Crowe & Gordon*
ATTORNEYS

United States Patent Office 2,799,328
Patented July 16, 1957

2,799,328

FLEXIBLE BAND TYPE ADJUSTABLE TIRE BEAD SPREADING TOOL

Alfred T. Pitman, Atlanta, Ga.

Application March 29, 1954, Serial No. 419,350

1 Claim. (Cl. 157—1.21)

The present invention provides improvements in mechanical devices constructed for the general purpose of applying pneumatic vehicle tires to wheel rims and it relates more particularly to a piece of equipment for facilitating the placement of tubeless tires to vehicle wheels in an efficient and expeditious manner.

In recent periods of times there has been a marked increase in the use of tubeless vehicle tires, which use is increasing steadily in volume. Such tires are characterized by absence of the usual inner tube which retains the inflating air and maintains the tires properly inflated for suitable service conditions. The development of tubeless tires for vehicular purposes results in important economic savings of strategic rubber, either natural or synthetic in origin.

In the utilization of tubeless tires difficulties are experienced in installing such tires on a wheel rim. Thus, when a tubeless tire is installed on a rim, both beads of the tire have a tendency to fall towards each other at the center line of the rim, so that when air is introduced into the tire casing for inflation thereof, there is a substantial leakage of air around the beads as there is no tube in the tire to retain the air. Therefore, in order to expand the beads against the rim of a wheel, it is necessary to apply pressure against the outside tread of the tire in a multiplicity of directions. In accordance with the usual practice, this expansion is accomplished by bumping the tire on the ground, or by applying a rope tourniquet around the outside tread of the tire and tensioning the applied tourniquet, which causes the beads of the tire to expand in rim-seating direction until the air forces them into tight rim-engaging position.

The improvements represented by the device of the present invention comprise, generally, a steel band having several adjustments so that the band can be adjusted to any size of tubeless tire. An operating lever for tensioning the band is connected to the band and the lever is applied on an eccentric so that when the band is tightened, the lever stays in closed position. The tool of the present invention is easily adjustable and can be applied quickly and easily to the tire, and the beads are greatly expanded when pressure is applied to the tool.

One of the principal objects of this invention is the provision of a tubeless automobile tire bead expanding device adapted to compressingly encircle the outer surface of the tire to expand the beads into proper rim engaging position to prevent substantial leakage of air around the beads during the initial tire inflating operation.

Another important object of this invention is the provision of a tubeless tire bead expanding device adapted to be on and in circumferential adjustable engagement with the tread surface of the tire, comprising an adjustable band and means for compressingly tightening the band to effect lateral spreading of the beads and to properly position them in engagement with the rim to prevent substantial leakage of air during the tire mounting and inflating operation.

In devices of this general nature it has proven difficult to effect the requisite circumferential pressure on a tubeless tire and to maintain the device in proper compressing position by reason of a twisting or shifting of the tightening mechanism, and the band, and therefore, a further object of this invention is the provision of a tensioning mechanism for expanding the beads of a tubeless tire, including an anchoring base element constructed in a manner such that it will remain in position and maintain the band in position on the tire while effecting the desired compression and resulting bead expansion during the tire inflation operation.

A still further object of this invention is the provision of a tubeless tire bead-expanding device comprising a tire tread-encircling band in connection with a base element seating on the tire, coacting means between the base and band for adjusting the band for different sized tires, and a handle means coacting with said band and adjustable with respect to said base to control the pressure of the band with respect to said tire and lockable with respect to said base to maintain said band in tire compressing and bead expanding position.

Further objects and advantages of the present invention will become apparent as the description proceeds and the features of novelty will be set forth in particularity in the appended claim.

The present improved construction will be understood more readily from the accompanying drawings, in which Fig. 1 is a side elevation of a tire-applying tool embodying the improved features of the present invention, the view showing the tool in operative position on a tire being applied to a wheel rim;

Fig. 2 is a top plan view of the improved tool of Fig. 1, parts being broken away;

Fig. 3 is a perspective view of a construction of locking means forming a part of the present improved tool;

Fig. 4 is a cross sectional elevation through a tubeless tire with the present tool applied thereto in operative position, the view being taken on the line 4—4 of Fig. 1, looking in the direction of the arrows;

Fig. 5 is a sectional elevation similar to Fig. 4, but showing the tire compressed with the beads in position for inflation.

Referring more particularly to the drawings, reference A indicates the rim of a vehicle wheel to which is being applied a tubeless tire B by means of the instrumentalities of the present invention. The tire B comprises a tubeless casing 1 having bead portions 2 and 3, the expansion of which against the rim A is a necessity for enabling the casing 1 to be inflated. In the drawing, the reference numerals 2 and 3 designate the beads of the tire B seating on the rim A between the peripheral flanges 2a and 3a thereof.

The expanding instrumentalities for the tire of the present invention comprise a flexible spring steel band 4, which is applied circumferentially around the tread 5 of the tire, the band 4 being tensioned by a lever 6 which is mounted on a base element 7, which is positioned on the tread 5 of the tire. This base element 7 is constructed in a manner such that it will remain in seated position on the tire and it maintains the band 4 in position on the tire while effecting the desired compression and resulting bead expansion of the tire during the inflation operation.

This base member 7 is a channel member having a bottom 8 which is adapted to seat on the tread 5 of the tire, and side walls 9 and 10, these being provided with transversely aligned parellel notches 11, the sides of which are sloped forwardly as shown in Figs. 1 and 3. The side walls 9 and 10 are braced by a rearwardly positioned pin 12 which is spaced above and extends transversely of the bottom 8 of the base channel and is secured in the side walls thereof by end heads 13 on the pin, these heads 13 engaging the side walls of the channels as shown on the drawings. There is also mounted in the channel bottom 8 an upstanding locking or anchoring pin 14, having a head 15 spaced above the bottom of the channel and which receives a keyhole slot 16, selected in accordance with the size of a particular tire. A plurality of spaced bayonet slots 16 are provided in the band 4. The engagement of a selected slot 16 with the upstanding locking pin 14 anchors the band to the base member 7 and enables application to the band of a selected tension by means of the lever 6, these bayonet slots 16 being positioned between the base member 7 and the adjacent end of the band 4 which is suitably fastened in a slide block 17 through which is slidably inserted the opposite end of the band to form a tensioning portion of the band indicated at 18, the free end of which is secured to the tensioning lever 6 by looping the end of the band, as indicated at 19, around and over a pin 20 mounted in the side arms 21 of a terminal mounting yoke 22 of the lever 6, these side arms 21 engaging the inner surface of the side walls of the base member 7 with laterally projecting fulcrum pins 23 received in a selected pair of transverse notches or slots 11 of the side walls of the base member 7.

These laterally projecting pins 23 seat in the bottoms of a selected transverse pair of these notches or slots 11 and form the fulcrum for the tensioning lever 6. As has been noted above, the end of the band 4 suitably secured in the slide block 17 is anchored to the pin 14 of the base 7, while the other end of the band, after being passed through this slide block is looped beneath and upwardly around the pin 20 of the lever yoke, and is anchored to the band itself by a rivet or equivalent fastening means 24, so that the pin 20 forms an anchor for the band and secures it to the lever 6, so that when the latter is mounted in the base member 7 and depressed with the band 4 circumferentially encircling the tire tread 5, the band 4 is pulled through the slide block 17 and tightly around the tire to compress and depress the tread 5, so that the beads 2 and 3 of the tire are spread apart and forced by the depression of the tread 5 of the tire into substantially air-tight engagement with the peripheral flanges 2a and 3a of the rim A, the beads 2 and 3 being maintained in this sealing engagement with the said flanges on the wheel rim until inflation of the tire is completed.

As is evident from the drawings, the requisite tire-compressing tension is enabled to be applied to the band 4 by mounting the lever 6 in the base member 7 with the fulcrum pins 23 inserted in the properly selected transverse pair of notches 11, and seating at the bottoms of the pair of notches which retain the lever against accidental displacement from the base member 7 during application and maintenance of the tension on the band 4.

It will be noted that the sides of notches 11 are sloped forwardly and downwardly relative to the base member 7, so that the engagement of the lever fulcrum pins 23 therewith impart an eccentric cam movement to the fulcrum pins 23 and to the lever 6 as the latter is depressed, and the arm 6 is locked in depressed position to maintain the tension in the band during the initial inflating operation and as desired.

When the band 4 is applied to the tire and before it is tensioned it is threaded beneath the rear pin 12 of the base member 7, this pin acting on the band to restrain it against expansion or twisting as the band is passed around the circumference of the tire. When the band is tensioned against the tire it clears this pin 12, but it is found in practice that the provision of this pin is a material convenience in applying the band to the tire in the maintenance of the band free from distortion, as well as reinforcing the side walls of the base member, as will be apparent from the drawings.

It will be understood also that the bottom member 8 of the base 7 is of a shape and sufficiently large in area to stabilize the seating of the member in position on the tire and to restrain any tendencies of the base member to twist or turn relative to the tire either during tensioning of band or during inflation of the tire. The position of the band member 7 relative to the tire is stabilized further by depression of the tread portion of the tire around the base member which increases the area of contact between the bottom 8 of the base member and the tire to prevent displacement of said member relative to the tire during the inflation operation.

From the above it will be apparent that I have provided a tubeless tire bead expanding device comprising a base member and a spring metal band having one end adjustably anchored to said member, said band adapted to embracingly engage the tread of the tire and slidably extending through a guide member mounted on the end of the anchored portion of the band with its other end attached to a tensioning mechanism adapted for adjustable engagement with said, the structural arrangement of said base and band being such as to be expeditiously mounted in operative compressing position on the tire tread for effecting relative expansion of the tire beads into rim flange engaging position to prevent leakage of air during the tire inflation operation, said device being simple in construction, comprising few parts, manufacturable at a negligible cost and efficient for the purpose intended.

Although in practice I have found that the form of my invention illustrated in the accompanying drawings and referred to in the above description as the preferred embodiment is the most efficient and practical, yet realizing that conditions concurrent with the adoption of my invention will necessarily vary, I desire to emphasize that various minor changes in details of construction, proportion and arrangement of parts may be resorted to within the scope of the appended claim without departing from or sacrificing any of the principles of this invention.

Having thus described my invention, what I desire protected by Letters Patent is as set forth in the following claim:

A tool for spreading the bead portions of a tubeless vehicle tire into engagement with the lateral flanges of a wheel rim for inhibiting leakage of air around the bead portions of the tire during inflation of the tire, which comprises a flexible band, a base channel member having a bottom and opposing sides, coacting means on the base member and on the band for enabling adjustment of the band for different sizes of tires, the coacting means including an attaching pin mounted on the bottom of the base member and extending upwardly therefrom for releasably receiving a selected slot from a plurality of spaced slots provided longitudinally in the band and spaced from one end of the band, a slide block carried by the band at said one end thereof, a tensioning lever connected intermediate its ends to the opposite end of the band, portions of the band leading to the said opposite end thereof being received in the slide block and freely passing therethrough with remaining portions of the band encircling the tire, oppositely disposed spaced means in the opposite sides of the base channel member for receiving pivot means at the end portions of the tensioning lever and providing fulcrums therefor, and brace means for the base member mounted in the sides thereof and extending transversely thereof above the bottom of the base member for enabling passage of said one end of the band beneath the brace means, the said brace means restraining the band within the base member during tensioning manipulations of the band with respect to the tire being expanded.

References Cited in the file of this patent
UNITED STATES PATENTS

| 867,518 | Mark | Oct. 1, 1907 |
| 1,966,580 | Bull | July 17, 1934 |
| 2,106,118 | Jackson et al. | Jan. 18, 1938 |
| 2,684,112 | Coats | July 20, 1954 |